J. NEILAN.
WATER HEATER.
APPLICATION FILED JAN. 16, 1914.

1,115,006.

Patented Oct. 27, 1914.

Witnesses
V. L. Richey
Anna Watters

Inventor
John Neilan
By John A. Bommhardt
Attorney

UNITED STATES PATENT OFFICE.

JOHN NEILAN, OF CLEVELAND, OHIO.

WATER-HEATER.

1,115,006.  Specification of Letters Patent.  Patented Oct. 27, 1914.

Application filed January 16, 1914. Serial No. 812,512.

*To all whom it may concern:*

Be it known that I, JOHN NEILAN, citizen of the United States, residing at Cleveland, in the county of Cuyahoga and State of Ohio, have invented certain new and useful Improvements in Water-Heaters, of which the following is a specification.

This invention relates to boilers or kettles for heating water and will be particularly serviceable where small quantities of hot water are necessary from time to time, as in bath rooms, barber shops and the like.

The object of the invention is to provide improved means for heating a relatively small quantity of water to a high temperature, without bringing all the water in a reservoir to the same temperature, means being provided to draw the water from the hot water chamber as desired and to replace the same by addition of water drawn from the reservoir.

The invention is illustrated in the accompanying drawings in which—

Figure 1:
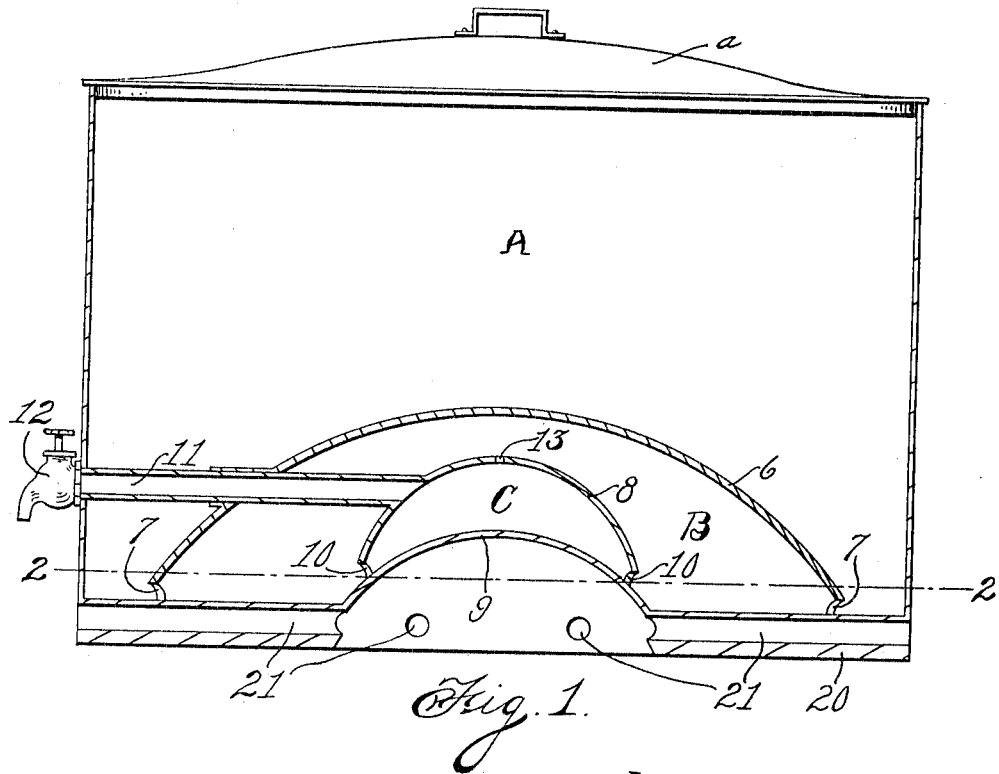
Figure 2:
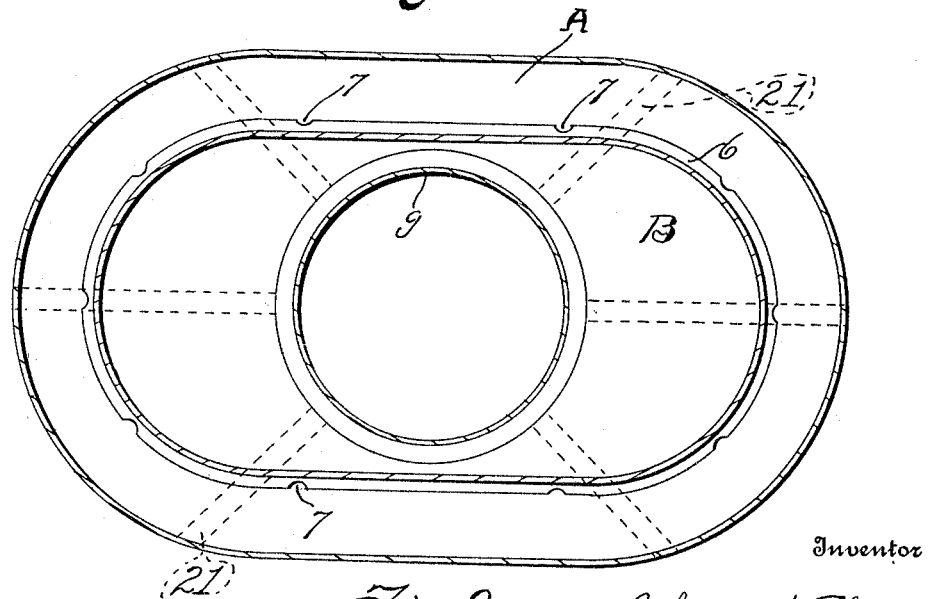

Figure 1 is a vertical section of the water heater or boiler. Fig. 2 is a section on the line 2—2 of Fig. 1.

Referring specifically to the drawings, A indicates a reservoir in the form of a kettle or boiler which may be made portable if desired, and which may be filled by removing the cover *a* at the top. In the bottom of this vessel is a dome-shaped partition 6 forming a chamber B thereunder, and the reservoir A communicates with the chamber B through openings 7 in said partition 6, said openings being located at or near the bottom of said chamber. The bottom plate 20 of the vessel is provided with a heat dome or recess 9 from which heat tubes 21 extend outwardly through the chamber B and through the partition 6 and the side wall of the vessel, permitting the products of combustion to pass from the heat dome through the heating chamber B and out at the sides of the vessel.

Within the chamber B, directly above the dome 9, is a dome shaped partition 8, forming a hot water chamber C of relatively small capacity, and this communicates with the chamber B through openings 10 near the lower edge of the partition 8 and is also provided with a discharge pipe 11 leading outwardly through the side of the vessel to a faucet 12. The partition 8 has a steam vent 13 at the top, communicating with the chamber B.

In the operation of the device, the reservoir A is filled with cold water which passes through the openings 7 and 10 to the chambers B and C respectively. On the application of heat, the water in the chamber C, being exposed to the hottest part of the flame, and being relatively small in quantity, becomes very hot, and may be drawn off at the faucet 12 as fast as needed. The water in the chamber B is warmed to a considerable extent, and as fast as the hot water is drawn from the chamber C it is refilled by water entering through the openings 10 from the chamber B, which in turn is supplied from the reservoir A through the openings 7. There is no circulation between the chambers A and B, that is, hot water cannot pass from the latter to the former, and hence it is trapped in the chamber B so that the whole body of water in the vessel does not have to be heated to the temperature desired; and similarly there is only a slight circulation between the chambers B and C, and the water in the latter can be brought practically to the boiling point and so maintained while it is drawn off, the relatively warm water in the chamber B flowing in as fast as the hottest water is drawn off.

The device will be found very serviceable for giving a quick and practically continuous supply of hot water from a portable vessel or reservoir, and without the cost for fuel required to heat all the water in the reservoir.

What I claim as my invention is:

1. A water heater comprising a vessel having an upper cold water reservoir, a lower warm water chamber and a passage connecting the reservoir and the bottom of the chamber, and a hot water chamber located adjacent to the warm water chamber and having a passage communicating with the latter, and means to draw water from the hot water chamber.

2. A water heater comprising a vessel having an upper chamber A for cold water, and a lower warm water chamber B, a partition between said chambers, having an opening therethrough near the bottom of said lower chamber, a heat dome in the bottom plate of the vessel, a partition above said dome over the hot water chamber C, said partition having an opening 10 near the bottom of said chamber C, and means to draw water from said chamber C.

3. A water heater comprising a vessel having an upper reservoir A for cold water, a partition therein over a lower warm water chamber B, with an opening in said partition near the bottom of said chamber, a heat dome in the bottom plate of the vessel, a partition above said dome over the hot water chamber C, said partition having an opening 10 near the bottom of said chamber C, and a vent 13 at the top of said chamber C, and means to draw water from said chamber C.

4. A water heater comprising a vessel having an upper reservoir for cold water, and a lower chamber for warm water, and a passage connecting the reservoir and the lower part of the said chamber, a heat dome in the bottom of said vessel, and tubes extending from said dome through said chamber to the sides of the vessel.

In testimony whereof, I do affix my signature in presence of two witnesses.

JOHN NEILAN.

Witnesses:
JOHN A. BOMMHARDT,
J. B. DAVIS.

Copies of this patent may be obtained for five cents each, by addressing the "Commissioner of Patents, Washington, D. C."